(12) United States Patent
Mezaael

(10) Patent No.: US 10,730,463 B2
(45) Date of Patent: Aug. 4, 2020

(54) TIGGER BASED VEHICLE MONITORING

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/005,210

(22) Filed: Jun. 11, 2018

(65) Prior Publication Data
US 2019/0375357 A1  Dec. 12, 2019

(51) Int. Cl.
| | |
|---|---|
| *B60R 1/00* | (2006.01) |
| *B60R 21/01* | (2006.01) |
| *B60R 11/04* | (2006.01) |
| *B60R 21/00* | (2006.01) |

(52) U.S. Cl.
CPC .............. *B60R 21/01* (2013.01); *B60R 1/00* (2013.01); *B60R 11/04* (2013.01); *B60R 2021/0027* (2013.01); *B60R 2021/01252* (2013.01); *B60R 2300/50* (2013.01)

(58) Field of Classification Search
None
See application file for complete search history.

(56) References Cited

U.S. PATENT DOCUMENTS

| | | | | |
|---|---|---|---|---|
| 8,131,419 | B2* | 3/2012 | Ampunan | G01M 17/007 |
| | | | | 701/29.3 |
| 9,538,374 | B2* | 1/2017 | Kaufmann | G07C 5/008 |
| 2002/0049826 | A1* | 4/2002 | Ariga | H04L 51/38 |
| | | | | 709/216 |
| 2017/0132709 | A1 | 5/2017 | Liu et al. | |
| 2017/0313248 | A1* | 11/2017 | Kothari | B60K 35/00 |
| 2018/0060970 | A1 | 3/2018 | Oduor et al. | |
| 2018/0155058 | A1* | 6/2018 | Fenton | B64C 39/024 |
| 2019/0171668 | A1* | 6/2019 | Agrawal | G06K 9/00758 |

FOREIGN PATENT DOCUMENTS

EP   2407943 A1 *  1/2012   ....... G08B 13/19669

OTHER PUBLICATIONS

Ether Technology, Inc. Video Event Recorders. Retrieved Jun. 12, 2018 from http://www.bulls-vehicledriverecorders.co/VideoEventRecorders.aspx.
Internet Archive. Video Event Recorders. Mar. 9, 2013. Retrieved Jun. 12, 2018 from https://web.archive.org/web/20130309204344/http://www.bulls-ivehicledriverecorders.co/VideoEventRecorders.aspx.

* cited by examiner

*Primary Examiner* — Shadan E Haghani
(74) *Attorney, Agent, or Firm* — Brooks Kushman PC

(57) ABSTRACT

Systems and methods include a vehicle monitoring for trigger events each corresponding to a defined vehicle activity. Responsive to identifying an occurrence of one of the trigger events, the vehicle captures, via a vehicle camera, video showing an area outside the vehicle for a set capture time. Responsive to the vehicle identifying that the vehicle is rendered inoperative from the identified trigger event, the vehicle transmits the captured video to a remote server.

16 Claims, 3 Drawing Sheets

TIGGER BASED VEHICLE MONITORING

TECHNICAL FIELD

Aspects of this disclosure generally relate to monitoring vehicles based on defined trigger events related to vehicle activity.

BACKGROUND OF THE INVENTION

The manner and conditions in which a driver operates a vehicle affects the likelihood that the vehicle will become damaged or that the driver will be injured. For example, overly aggressive driving maneuvers may limit the driver's ability to maintain control of the vehicle, especially during poor weather conditions and heavy traffic.

SUMMARY OF THE INVENTION

In one exemplary embodiment, a system includes a vehicle configured to monitor for a plurality of trigger events each corresponding to a defined vehicle activity. Responsive to an occurrence of one of the trigger events, the vehicle is configured to capture, via a video camera, video showing an area outside the vehicle for a set capture time. Responsive to the vehicle identifying that the vehicle is rendered inoperative from the one trigger event, the vehicle is further configured to transmit the captured video to a remote server.

In a further exemplary embodiment, a method includes monitoring, by a vehicle, for trigger events each corresponding to a defined vehicle activity. Responsive to the vehicle identifying an occurrence of one of the trigger events, the method includes capturing, via a vehicle camera, video showing an area outside the vehicle for a set capture time. Responsive to the vehicle identifying that the vehicle is rendered inoperative from the one trigger event, the method further includes transmitting the video to a remote server.

In another exemplary embodiment, a system includes a vehicle configured to monitor for a trigger event corresponding to a vehicle activity defined by a vehicle user. Responsive to the trigger event, the vehicle is configured to capture, via a vehicle camera, video showing an area outside the vehicle for a set capture time. The vehicle is further configured to illustrate, on a vehicle display, a prompt configured to receive user input indicating discard the video and user input indicating transmit the video to a mobile device of the user.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
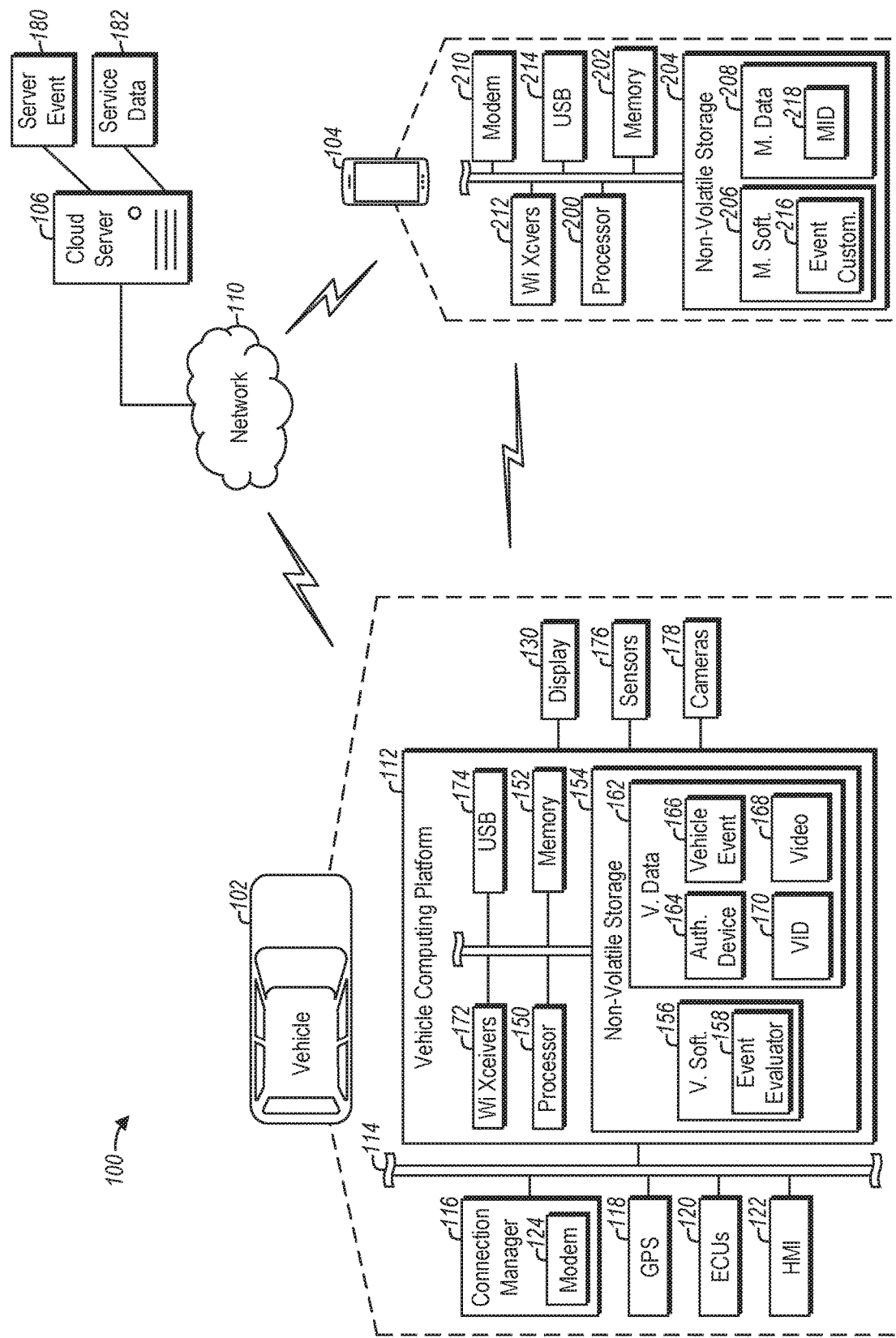
FIG. 1 is a schematic diagram illustrating an exemplary system for monitoring a vehicle based on defined trigger events.

FIG. 1 illustrates a system 100 for intelligently monitoring a vehicle 102 based on defined trigger events. In particular, the vehicle 102 may be configured to monitor for the occurrence of the defined trigger events. Each trigger event may correspond to a different defined vehicle activity, such as a malfunction, a collision, or a particular driving behavior by a driver of the vehicle 102, each of which may indicate a poor driving performance by a driver of the vehicle 102. For example, one trigger event may correspond to excessive braking by a vehicle 102 driver, which may indicate that the driver is slow to react, and may indicate an increased likelihood that the driver will be rear ended or the brakes of the vehicle 102 will need to be replaced sooner rather than later. Another trigger event may correspond the vehicle 102 being in motion while the seat belt of an occupied seat is not buckled, which may indicate an increased likelihood that the vehicle 102 occupant will be injured if involved in a road incident.

Responsive to identifying the occurrence of one of the trigger events, the vehicle 102 may be configured to capture video for a set capture time via a vehicle 102 camera. The captured video may show an area outside the vehicle 102, and may thus illustrate environmental conditions during and following the occurrence of the identified trigger event. The vehicle 102 may be configured to store the captured video for the identified trigger event for later retrieval and may be configured under certain conditions, such as when the vehicle 102 is rendered inoperative from the trigger event, to automatically transmit the captured video to a remote server facilitating provision of a service related to the vehicle 102 provided by a service provider. The video may provide the service provider increased clarity of the circumstances surrounding to the identified trigger event.

The unconventional arrangement of components and functions described herein overcomes technical limitations relating to storage and transmission of vehicle video while also providing improved vehicle monitoring. Specifically, captured video generally utilizes more storage and transmission capacity than other types of data. Continuously or regularly storing captured video in a vehicle can quickly fill up the storage capabilities of the vehicle, resulting in a need to overwrite old video or discard new video showing relevant information. Furthermore, the transmission of large amounts of video data by a moving vehicle over a wireless network may be costly and slow, and communication infrastructure may be unable to keep up with the rate in which the video is captured. The combination of monitoring for defined trigger events corresponding to specified vehicle 102 activities, such as defined driving behaviors indicative of poor driver performance, and capturing video content via a vehicle video camera responsive to occurrence of one of the trigger events for a set capture time, along with the other features described herein, alleviates these issues by using a technology-based solution (e.g., detection of trigger events via vehicle sensors) to focus the video data that is stored by and transmitted from the vehicle 102.

The system 100 may include a vehicle 102, one or more mobile devices 104, and a cloud server 106. Each of these system 100 components may communicate with one or more of the other components directly and/or over the network 110. The network 110 may include one or more interconnected communication networks, such as one or more of the Internet, a cable television distribution network, a satellite link network, a local area network, a wide area network, and a telephone network.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV), or an electric vehicle powered by one or more electric motors alone. The vehicle 102 may also be an autonomous vehicle (AV). As the type and configuration of the vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include, such as in its non-volatile storage 154, a unique vehicle identifier 170, such as a Vehicle Identification Number ("VIN").

The vehicle 102 may include a vehicle computing platform 112 configured to perform functions in support of the features and processes described herein. For example, the vehicle computing platform 112 may be configured to monitor for various trigger events corresponding to defined driver behaviors. Responsive to identifying an occurrence of any one of the trigger events, the vehicle computing platform 112 may be configured to capture video via a camera 178 of the vehicle 102 for a set capture time, and to store the captured video in an onboard embedded data storage device (e.g., non-volatile storage 154). The vehicle computing platform 112 may also be configured to transmit the captured video to the cloud server 106, which may adjust services provided for the vehicle 102 based thereon. These and other features of the vehicle computing platform 112 are described in more detail below.

The vehicle computing platform 112 may communicate with other vehicle 102 components via one or more in-vehicle networks 114. The in-vehicle networks 114 may include one or more of a vehicle controller area network (CAN), an Ethernet network, and a media oriented system transfer (MOST) network. The other vehicle 102 components with which the vehicle computing platform 112 may communicate may include a connection manager 116, a global positioning satellite (GPS) module 118, various vehicle electronic control units (ECUs) 120, and a human machine interface (HMI) 122.

The connection manager 116 may be configured to facilitate wireless communication between the vehicle 102 components and other components of the system 100 over the network 110. The connection manager 116 may be configured to facilitate such wireless communication via radio frequency (RF) transmissions. The connection manager 116 may include a cellular modem 124 or another wireless network transceiver (e.g., Wi-Fi transceiver) configured to connect to the network 110, such as over a cellular network to which the cellular modem 124 is subscribed. The other vehicle 102 components may access the communication capabilities of the connection manager 116, and thereby communicate with other system 100 components over the network 110, via the in-vehicle networks 114.

The GPS module 118 of the vehicle 102 may be configured to identify vehicle 102 geographical data, such as via communicating with one or more satellites over a satellite link network of the network 110. The vehicle 102 geographical data may include a current location (e.g., latitude and longitude coordinates, street address, nearest intersection(s)) and current bearing of the vehicle 102. The GPS module 118 may be configured to provide the vehicle 102 geographical data to the other vehicle 102 components, such as the vehicle computing platform 112, automatically or on request.

The vehicle ECUs 120 may be configured to monitor and manage various functions of the vehicle 102 under the power of the vehicle 102 battery and/or drivetrain. The vehicle ECUs 120 may include, but are not limited to, one or more of a radio transceiver controller configured to manage wireless communications with mobile devices 104 and other local vehicle 102 devices; a powertrain controller configured to monitor and manage engine operating components; a body controller configured to monitor and manage various power control functions such as exterior lighting, interior lighting, keyless entry, remote start, and point of access status verification; and a climate management controller configured to monitor and manage heating and cooling system components (e.g., compressor clutch, blower fan, temperature sensors). The vehicle ECUs 120 may also be configured to implement driver assistance systems, such as an anti-lock braking system or traction control system, that control the vehicle 102 in hazardous situations indicated in data generated by vehicle 102 sensors.

The HMI 122 may facilitate user interaction with the other vehicle 102 components, such as the vehicle ECUs 120 and the vehicle computing platform 112. The HMI 122 may include one or more video and alphanumeric displays, a speaker system, and any other suitable audio and visual indicators capable of providing data from the other vehicle 102 components to the user. The HMI 122 may also include a microphone, physical controls, and any other suitable devices capable of receiving input from a user to invoke functions of the other vehicle 102 components. The physical controls may include an alphanumeric keyboard, a pointing device (e.g., mouse), keypads, pushbuttons, and control knobs. As a specific example, the physical controls may include steering wheel audio buttons, a push-to-talk button, instrument panel controls, and the like. A display of the HMI 122 may also include a touch screen mechanism for receiving user input.

The vehicle computing platform 112 may be configured to provide entertainment and informational services to a user, such as via a graphical user interface (GUI) shown on a display 130 embedded in the vehicle 102 and driven by the vehicle computing platform 112. For example, the vehicle computing platform 112 may be configured to provide navigation, radio, playing music from a connected mobile device 104, hands free telephone calling via a connected mobile device 104, voice command recognition, and vehicle applications based on data received from a connected mobile device 104 or from the network 110 (e.g., Internet data, data from the cloud server 106).

The vehicle computing platform 112 may also be configured to illustrate vehicle information from the other vehicle 102 components, such as the connection manager 116, the GPS module 118, and the vehicle ECUs 120, via the HMI 122 and/or the display 130. The vehicle computing platform 112 may likewise be configured to process user input for one or more of the vehicle 102 components, including the vehicle computing platform 112, submitted via the HMI 122 or the display 130, which may include a touch screen mechanism for receiving such user input. In other words, the vehicle computing platform 112 may function as a gateway between the HMI 122 and/or display 130 and one or more of the other vehicle 102 components, and may be configured, responsive to receiving user input for a given vehicle 102 component, to communicate instructions corresponding to the input to the given vehicle 102 component for processing. In addition, or alternatively, the HMI 122 and/or display 130 may be connected to and communicate with one or more of the other vehicle 102 components directly.

The vehicle computing platform 112 may include a processor 150, memory 152, and non-volatile storage 154. The processor 150 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 152. The memory 152 may include a single memory device or a plurality of memory devices including, but not limited to, random access memory ("RAM"), volatile memory, non-volatile memory, static random access memory ("SRAM"), dynamic random access memory ("DRAM"), flash memory, cache memory, or any other device capable of storing information. The non-volatile storage 154 may include one or more persistent data storage devices such as a hard drive, optical drive, tape drive, non-volatile solid state device, or any other device capable of persistently storing information.

The processor 150 may be configured to read into memory 152 and execute computer-executable instructions embodied as vehicle software 156 residing in the non-volatile storage 154. This vehicle software 156 may include an operating system and applications, and may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL. The vehicle software 156 may be configured, upon execution by the processor 150, to cause the vehicle computing platform 112 to implement the functions, features, and processes of the vehicle computing platform 112 described herein.

For example, the vehicle software 156 may include a set of computer-executable instructions embodying an event evaluator 158. Execution of the computer-executable instructions embodying the event evaluator 158 may cause the vehicle computing platform 112 to implement the functions, features, and processes of the event evaluator 158, such as monitoring for trigger events each corresponding to a different vehicle 102 activity, which may be indicative of poor driving performance, capturing video via a camera 178 of the vehicle 102 responsive to a trigger event, to generate an event record for the trigger event that references the captured video, and to transmit the event record and captured video to the cloud server 106 over the network 110. In other words, the event evaluator 158, upon execution by the computing platform 112, may be configured to perform these and other functions of the of the event evaluator 158, which are described in more detail below.

The non-volatile storage 154 of the vehicle computing platform 112 may also include vehicle data 162. The vehicle software 156 may access the vehicle data 162 to provide the functions, features, and processes of the vehicle computing platform 112 described herein. For example, responsive to receiving a request from a mobile device 104 to establish a wireless connection with the vehicle computing platform 112, the vehicle software 156 may be configured to query authorized device data 164 of the vehicle data 162 to determine whether the connection is permitted. If so, then the vehicle software 156 may permit the connection.

The vehicle data 162 may also include vehicle event data 166, which may define the trigger events monitored for by the event evaluator 158. The vehicle data 162 may further include video data 168, which may include records of the trigger events identified by the event evaluator 158, and may include video captured responsive to the identified trigger events. The vehicle data 162 may further include a vehicle identifier 170, such as the VIN of the vehicle 102. When transmitting video data 168 to the cloud server 106, the event evaluator 158 may include the vehicle identifier 170 so as to enable the cloud server 106 to recognize that the received video data 168 is from the vehicle 102, and to adjust services particular to the vehicle 102 accordingly.

The non-volatile storage 154 may include one or more databases for collecting and organizing the vehicle data 162 stored therein. For example, each of the authorized device data 164, the vehicle event data 166, and the video data 168 may be arranged within a database organization or structure, including, but not limited to, a relational database, a hierarchical database, a network database, or combinations thereof. A database management system in the form of computer software executing as instructions on the processor 150 may be used to access the information or stored data records of the databases in response to a query, which may be dynamically determined and executed by the vehicle software 156.

The vehicle computing platform 112 may also include one or more wireless transceivers 172 and a universal serial bus (USB) subsystem 174 configured to facilitate direct communication between the vehicle 102 and other components of the system 100, such as when these other components are local to (e.g., within direct wireless or wired communication range of) the vehicle 102. For example, the vehicle computing platform 112 may be configured to engage in direct communication with a local mobile device 104.

The mobile devices 104 may include a personal computing device of a user of the vehicle 102, such as a mobile phone, tablet, or laptop, and may include a wireless device specific to operating the vehicle 102, such as a key fob. Similar to the vehicle computing platform 112, the mobile device 104 may include a processor 200, memory 202, and non-volatile storage 204 including mobile software 206 that, upon being read into the memory 202 and executed by the processor 200, causes the mobile device 104 to implement the functions, features, and processes of the mobile device 104 described herein. For example, the mobile software 206 may be configured upon execution to cause the mobile device 104 to implement an event customizer 216, which may be configured to enable a user to define trigger events corresponding to specific vehicle 102 activities, such as defined driver behaviors, to be monitored for by the event evaluator 158 of the vehicle 102.

The non-volatile storage 204 of the mobile device 104 may further include mobile data 208 utilized by the mobile software 206 of the mobile device 104. For example, the mobile data 208 may include a mobile identifier 218 utilized by the mobile software 206 to identify the mobile device 104, and correspondingly the user to which the mobile device 104 belongs, to the vehicle computing platform 112 and the cloud server 106. The mobile device 104 may also include wireless transceivers 212 and a USB subsystem 214, which may correspond to the wireless transceivers 172 and the USB subsystem 174 of the vehicle 102 respectively, and may thus be configured to enable direct communication between the vehicle computing platform 112 and a local mobile device 104.

The wireless transceivers 172 of the vehicle 102 and the wireless transceivers 212 of the mobile device 104 may be configured to communicate via RF transmissions. Each of the wireless transceivers 172 and the wireless transceivers 212 may include, without limitation, a Bluetooth transceiver, a ZigBee transceiver, a Wi-Fi transceiver, a radio-frequency identification ("RFD") transceiver, a near-field communication ("NFC") transceiver, and/or a transceiver designed for another RF protocol particular to a remote service provided by the vehicle 102 (e.g., keyless entry, remote start, passive entry passive start).

As an example, responsive to a user interaction with the mobile device 104 indicating a remote control command for the vehicle 102, the mobile device 104 may be configured to directly and wirelessly transmit a command request to the vehicle 102 via the wireless transceivers 172, 212. The command request may indicate the requested remote control command, which may include, without limitation, an unlock request, a trunk open request, a lock request, a remote start request, or a panic request. The command request may also include the mobile identifier 218 stored in the non-volatile storage 204 of the mobile device 104. The mobile identifier 218 may be specific to the mobile device 104, may be an alphanumeric code, and may be encrypted.

The vehicle 102 may be configured to receive and process the command request when the vehicle 102 is in an off state or an on state. Responsive to the vehicle computing platform 112 receiving the command request, the vehicle software 156 may be configured determine whether the mobile device 104 is authorized to make the command. For example, the vehicle software 156 may be configured to compare the mobile identifier 218 of the received request with the authorized device data 164 to determine if a match exists. As part of this comparison, the vehicle software 156 may be configured to decrypt the received mobile identifier 218. If a match exists, then the vehicle software 156 may be configured to implement the command. For example, if the command is an unlock request, then the vehicle software 156 may be configured to communicate a message to the body controller that causes the body controller to unlock the vehicle 102. If the command is a remote start request, then the vehicle software 156 may be configured to communicate a message to the powertrain controller that causes the powertrain controller to start the vehicle 102 engine.

As a further example, the wireless transceivers 172 may include several wireless transceivers arranged around the vehicle 102, such as near vehicle 102 access points (e.g., trunk release, door handle, engine start button or ignition slot). Each of these wireless transceivers may be associated with its nearby access point. When a mobile device 104 comes into direct wireless communication range of one of these wireless transceivers, or when a mobile device 104, such as a key fob, is placed within the vehicle 102 ignition slot and rotated, the mobile device 104 may be configured to automatically transmit its mobile identifier 218 to the vehicle computing platform 112 via the in-range wireless transceiver.

Responsive to the vehicle computing platform 112 receiving the mobile identifier 218 and to determining that the mobile identifier 218 matches the authorized device data 164, the vehicle computing platform 112 may be configured to enable the access point associated with the receiving wireless transceiver, such as by communicating an enablement signal to the vehicle 102 component capable of operating the access point, at least until the mobile identifier 218 ceases to be received via the wireless transceiver. For example, if the mobile identifier 218 is received via a wireless transceiver associated with a given door handle of the vehicle 102, then the vehicle computing platform 112 may be configured to cause the vehicle 102 to unlock upon a user interaction with the door handle, such as by communicating an enablement signal to the body controller. As another example, if the mobile identifier 218 is received by a wireless transceiver associated with a vehicle 102 start button or ignition slot, then the vehicle computing platform 112 may be configured to cause the vehicle 102 to start the engine upon interaction with the start button or rotation of the mobile device 104 within the ignition, respectively, such as by sending an enablement signal to the powertrain controller.

As a further example, responsive to the vehicle 102 being powered on, the wireless transceivers 172 of the vehicle computing platform 112 may receive a connection request from the wireless transceivers 212 of the mobile device 104. The connection request may include the mobile identifier 218 specific to the mobile device 104. Responsive to receiving the connection request, the vehicle computing platform 112 may be configured to determine whether the mobile device 104 has permission to form a connection with the vehicle computing platform 112, such as via determining whether the mobile identifier 218 is included in the authorized device data 164. If so, then the vehicle computing platform 112 may automatically permit the request. If not, then the vehicle computing platform 112 may be configured to prompt a vehicle 102 occupant whether the connection should be permitted, such as via the display 130. Responsive to receiving user input indicating such permission, such as via the HMI 122 or the display 130, the vehicle computing platform 112 may be configured to permit the connection with the mobile device 104. The vehicle computing platform 112 may further be configured to store the mobile identifier 218 for the mobile device 104 in the authorized device data 164 so as to automatically permit further connection requests from the mobile device 104 without prompting a user.

The wireless connection formed between the vehicle computing platform 112 and the mobile device 104 may enable the vehicle computing platform 112 to provide in-vehicle infotainment services that rely on data from the mobile device 104. For example, the wireless connection, which may be a Bluetooth connection, may enable the provision of services such as, without limitation, hands-free telephone calling, music streaming, and in-vehicle applications reliant on content from the mobile device 104. Moreover, the wireless connection, which may be a Wi-Fi connection, may function to share an Internet connection of the vehicle 102 (established via the connection manager 116) with the mobile device 104. Moreover, rather than communicating with the network 110 via the connection manager 116, the vehicle 102 components may be configured to communicate with the network 110 via a wireless connection or a wired USB connection formed between the vehicle 102 and the mobile device 104, and via an Internet connection formed via the cellular modem 210 of the mobile device 104.

The vehicle 102 may also include several sensors 176 operatively coupled to the vehicle computing platform 112. The sensors 176 may be arranged around and within the vehicle 102, and may be configured to generate data indicative of vehicle activity, such as driving behaviors by a driver operating the vehicle 102. The event evaluator 158 may be configured to identify the occurrence of the defined trigger events from the data generated by the sensors 176.

As some non-limiting examples, the sensors 176 may include a speed sensor configured to measure and indicate a current speed of the vehicle 102, an accelerometer configured to measure and indicate a current acceleration level of the vehicle 102, an odometer configured to measure and indicate a current distance traveled by the vehicle 102, a tachometer configured to measure and indicate a current working speed of the vehicle 102 engine, a gyroscope or compass configured to identify and indicate a current heading of the vehicle 102, and a steering wheel sensor configured to identify and indicate a current steering wheel position of the vehicle 102. The sensors 176 may further include, without limitation, one or more impact sensors configured to identify and indicate external impacts experienced by the vehicle 102, one or more airbag sensors configured to identify and indicate airbag deployments of the vehicle 102, a wheel touch sensor configured to identify and indicate whether the steering wheel is being touched, one or more seatbelt sensors configured to identify and indicate whether each vehicle 102 seatbelt is buckled, one or more weight sensors configured to identify and indicate whether a vehicle 102 seat is occupied by a person, and a sway sensor configured to identify and indicate swaying by a trailer or haul being towed by the vehicle 102. The sensors 176 may additionally include, without limitation, one or more proximity sensors (e.g., RADAR, LIDAR, SONAR, ultrasonic) configured to identify and indicate the presence of an object proximate the vehicle 102 and the distance between the object and the vehicle 102.

The sensors 176 may also include, without limitation, driving condition sensors configured to identify and indicate control by various vehicle 102 driver assistance systems implement by the vehicle ECUs 120, such an anti-lock braking system or a traction control system of the vehicle 102. In addition, the sensors 176 may include component sensors configured to identify and generate data indicative of the current state of vehicle 102 components, such a current gear of the vehicle 102 (e.g., driver gear, reverse gear, neutral) and malfunctions (e.g., engine malfunctions, driver assistance system malfunctions, mechanical malfunctions, and vehicle ECU 120 malfunctions). The vehicle ECUs 120, which may be configured to generate data indicative of the current state of vehicle 102 components, may thus also be considered vehicle 102 sensors.

Responsive to the vehicle 102 sensors generating data indicative of a vehicle 102 malfunction, the vehicle ECUs 120 or the vehicle computing platform 112 may be configured to generate a diagnostic trouble code (DTC) corresponding to the malfunction. Such DTCs may also be considered as data indicative of vehicle 102 activities generated by the vehicle 102 sensors. The GPS module 118, which may identify geographical data for the vehicle 102, may also be considered as a sensor of the vehicle 102 configured to generate data indicative of vehicle 102 activities. Thus, during operation of the system 100, the event evaluator 158 may be configured to identify the occurrence of trigger events defined in the vehicle event data 166 based on the vehicle 102 activity data generated by the sensors 176, the vehicle ECUs 120, and the GPS module 118.

The vehicle 102 may further include one or more embedded cameras 178 operatively coupled to the vehicle computing platform 112. Responsive to identifying a trigger event defined in the vehicle event data 166, the event evaluator 158 may be configured to operate the cameras 178 to capture video for a set capture time. The video captured by the cameras 178 may show one or more areas outside the vehicle 102, and may thus illustrate the environmental, infrastructure, and traffic conditions in which the vehicle 102 is operating. The event evaluator 158 may be configured to store such captured video in an onboard electronic storage device, such as the non-volatile storage 154 of the vehicle 102, as video data 168. The event evaluator 158 may further be configured to transmit the video data 168 to the cloud server 106 over the network 110.

The cameras 178 of the vehicle 102 may form a three hundred sixty-degree camera system configured to capture video of the area surrounding the vehicle 102. Specifically, the cameras 178 may include cameras arranged around the vehicle 102, with each being configured to capture a different portion of the area surrounding the vehicle 102. For example, the cameras 178 may include a camera mounted to the trunk of the vehicle 102 that is configured to capture video showing the area behind the vehicle 102, may include a camera mounted to each side mirror of the vehicle 102 that is configured to capture video showing the area on the respective vehicle 102 side, and may include a camera mounted to the hood or grill of the vehicle 102 that is configured to capture video showing the area in front of the vehicle 102. The cameras 178 of the vehicle 102 may serve additional functions in addition to capturing video responsive to the defined trigger events, such as providing captured video to the display 130 that assists the driver when reversing or when navigating tight spaces.

The vehicle computing platform 112 may be configured to associate or stitch together the video captured by the cameras 178 to produce video data 168 that shows the area surrounding the vehicle 102 following an identified trigger event. The produced video data 168 may include multiple video files each showing a portion of the area surrounding the vehicle 102 captured by a different camera 178. In addition or alternatively, the produced video data 168 may include a video file showing all of the portions captured by the different cameras 178 stitched together, such as by showing a top down view of the vehicle 102 surrounded by the portions captured by the different cameras 178.

Similar to the vehicle computing platform 112 and the mobile device 104, other system 100 components and other vehicle 102 components, such as the cloud server 106, the GPS module 118, each of the vehicle ECUs 120, and the HMI 122, may each include a processor, memory, and non-volatile storage having computer executable instructions and data utilized by the component. The processor of a given component may be configured to read into memory and execute the computer executable instructions of the component, which may be configured, upon execution, to cause the component to implement the functions, features, and processes of the component described herein.

The cloud server 106 may facilitate the provision of services for the vehicle 102 or drivers of the vehicle 102 that relate to vehicle 102 activities, such as by defining trigger events that cause the vehicle 102 to capture video for a set capture time. For example, the cloud server 106 may facilitate the provision of usage-based insurance for the vehicle 102 or drivers of the vehicle 102, such as by defining trigger events corresponding to driving behaviors that may affect a driver's insurance rate. As another example, the cloud server 106 may facilitate the provision of law enforcement services for the vehicle 102 and/or drivers of the vehicle 102, such as by defining trigger events corresponding to vehicle 102 activities that relate to traffic and other legal violations. As an additional example, the cloud server 106 may facilitate the provision of maintenance, repair, and warranty services for the vehicle 102, such as by defining trigger events corresponding to vehicle 102 activities that relate to damage of the vehicle 102 (e.g., the vehicle 102 recording a diagnostic trouble code (DTC) may be a trigger event).

The cloud server 106 may maintain server event data 180, such as in a database stored in a non-volatile storage device accessible to the cloud server 106. The server event data 180 may define several trigger events relevant to the service provided via the cloud server 106. For example, each defined trigger event may relate to a driving behavior, such as excessive acceleration or excessive braking, and may include instructions for recognizing the driving behavior (e.g., sensing data indicative an acceleration level of the vehicle 102 beyond a set threshold acceleration level). The cloud server 106 may be configured to transmit the server event data 180 to the vehicle 102 over the network 110. The vehicle 102 may be configured, upon receiving the server event data 180, to store the defined trigger events in the non-volatile storage 154 of the vehicle 102 as vehicle event data 166. The event evaluator 158 may then be configured, based on the trigger events defined in the vehicle event data 166, to identify occurrence of the defined trigger events based on data generated by the vehicle 102 sensors.

The cloud server 106 may also maintain service data 182, such as in a database stored in a non-volatile storage device accessible to the cloud server 106. The service data 182 may include, for each vehicle or driver served by the cloud server 106, an identification of the served vehicle or driver, and information about the services provided to the vehicle or driver via the cloud server 106. For example, in the case of usage-based insurance, the service data 182 may include details about the policy issued for each vehicle or driver, such as coverage, cost, and an assigned cost formula for determining cost as a function of vehicle 102 activities such as driving behaviors. The service data 182 may further include defined trigger events that have been identified for each served vehicle or driver, and video captured responsive to such trigger events. For each identified trigger event, the service data 182 may further include the vehicle 102 sensor data from which the trigger event was identified.

A service provider may access the cloud server 106 to analyze the service data 182 for a served vehicle or driver, including any stored captured video, and to adjust or facilitate the services for the vehicle or driver based thereon. Additionally, the cloud server 106 may be configured to automatically adjust the services provided to a vehicle or driver by applying the trigger events and generated sensor data indicated in the service data 182 for the vehicle or driver to a formula, such as a cost formula, assigned to the vehicle or driver within service data 182.

While an exemplary system 100 is shown in FIG. 1, the example is not intended to be limiting. Indeed, the system 100 may have more or fewer components, and alternative components and/or implementations may be used. For instance, a given vehicle 102 component illustrated in FIG. 1 may be configured to implement at least some or all of the described functions of another vehicle 102 component. As a non-limiting example, some of the functionality of the vehicle computing platform 112, such as keyless and passive entry, may be implemented by the vehicle ECUs 120. In addition, the vehicle 102 may include another component in addition to the vehicle 102 components illustrated in FIG. 1 that is separately connected to the in-vehicle networks 114, and that is configured to implement at least some of the described functions of another vehicle 102 component. For instance, the vehicle 102 may include another component specifically configured to implement the event evaluator 158.

Figure 2:
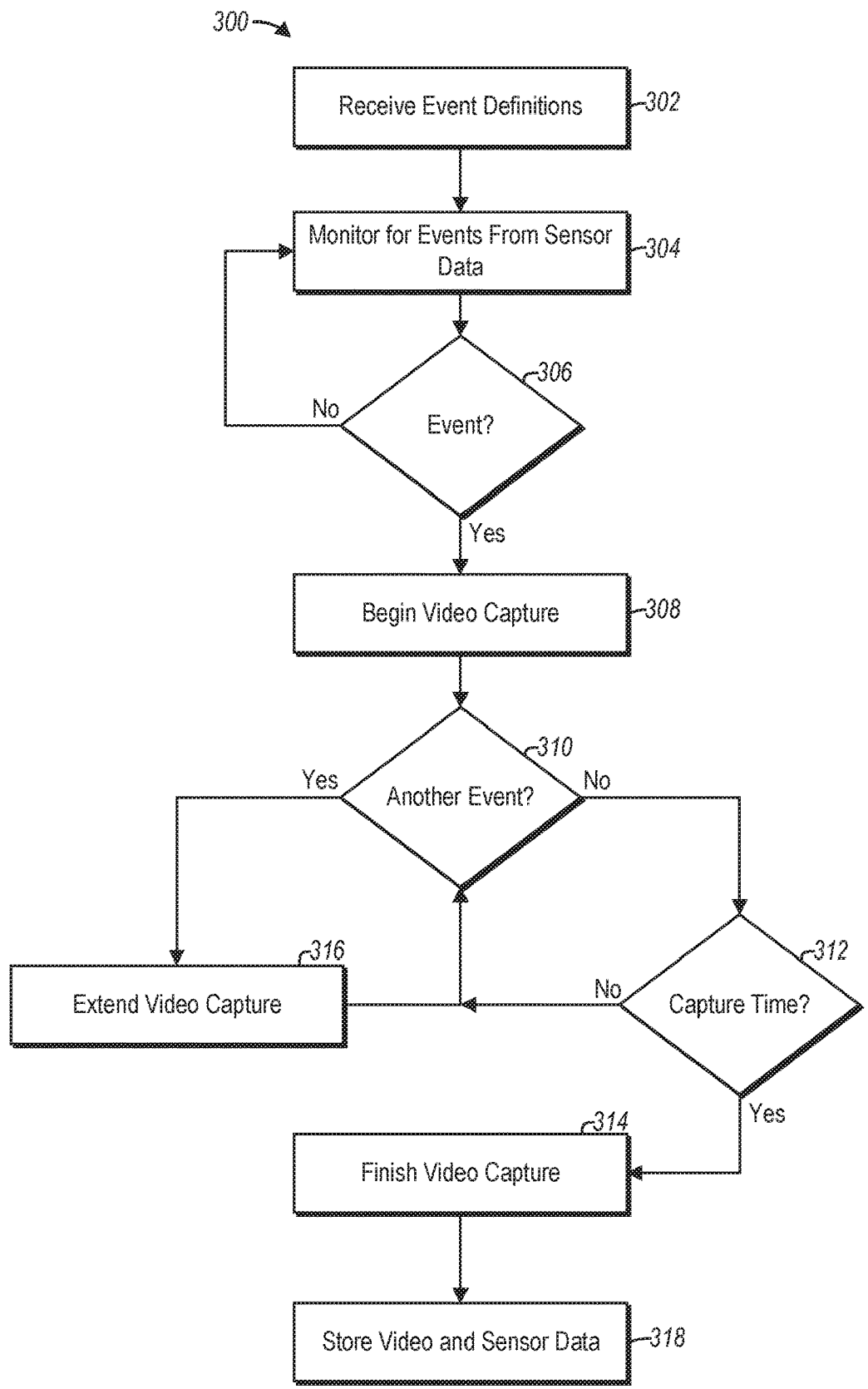
FIG. 2 is a flowchart illustrating an exemplary process for capturing vehicle video that may be performed by the system of FIG. 1.

FIG. 2 illustrates a process 300 that may be performed by the system 100. Specifically, the event evaluator 158 of the vehicle 102 may be configured to perform the process 300 to identify the occurrence of trigger events defined in the vehicle event data 166, and to automatically capture video of an area outside the vehicle 102 responsive to identifying occurrence of the trigger events.

In block 302, trigger event definitions may be received, such as at the event evaluator 158. Each trigger event definition may correspond to an event experienced by the vehicle 102. For example, one or more of the defined trigger events may correspond to a different driving behavior indicative of driver performance, or more particularly poor driver performance. The event evaluator 158 may be configured to identify occurrence of one of these trigger events by identifying the specific driving behavior corresponding to the trigger event from data generated by the sensors of the vehicle 102.

As some non-limiting examples, one of the trigger events may correspond to an excessive acceleration event, and may be defined as a current acceleration of the vehicle 102, such as indicated in data generated by the sensors of the vehicle 102 (e.g., speed sensor, accelerometer), being greater than a set acceleration threshold. Another defined trigger event may correspond to an excessive braking event, and may be defined as a current deceleration of the vehicle 102 (i.e., negative acceleration), such as indicated in data generated by the sensors of the vehicle 102 (e.g., speed sensor, accelerometer), being less than a set deceleration threshold. A further defined trigger event may be a collision event, and may be defined as the sensors of the of the vehicle 102 (e.g., impact sensor) generating data indicative of an impact greater than a set collision threshold. Another defined trigger event may be a hard-steering event that corresponds to a change in heading of the vehicle 102 or a change in steering wheel position that is beyond a set change threshold and is within a set timeframe, such as indicated in data generated by a compass, gyroscope, GPS module 118, and/or wheel position sensor of the vehicle 102.

Additional non-limiting examples of trigger events may include the following: a trailer sway event, such as indicated in data generated by a sway sensor of the vehicle 102; automated vehicle control events, such as indicated in data generated by driving condition sensors of the vehicle 102 configured to identify and indicate control activity by vehicle 102 driver assistance systems, a hands off wheel event, which may correspond to no hands on the vehicle 102 steering wheel while the vehicle 102 is in motion, such as indicated in data generated by the wheel touch sensor of the vehicle 102; and a seatbelt alert event, which may correspond to driving the vehicle 102 without the seatbelt for an occupied seat being buckled, such as indicated in data generated by a seatbelt sensor and weight sensor of the vehicle 102. Another non-limiting example of a trigger event may be a reverse gear alert, which may be defined as the vehicle 102 being in the reverse gear, or may be defined as an object being identified as in proximity to or less than a set distance threshold from the vehicle 102 while the vehicle 102 is in the reverse gear, such as indicated in data generated by the component sensors of the vehicle 102 and in data generated by the proximity sensors of the vehicle 102.

As a further non-limiting example, a defined trigger event may correspond to a combination of vehicle 102 activities indicated by the sensors of the vehicle 102. For example, a trigger event may correspond to a combination of excessive acceleration and excessive braking, as described above, occurring within a set time span. Another exemplary trigger event may correspond to a combination of excessive braking and hard steering, as described above, within a set time span, which may indicate collision avoidance. A further exemplary trigger event may correspond to a combination of excessive braking and a collision event, as described above, within a set time span, which may indicate a failed attempt at collision avoidance.

The trigger event definitions may be received from the cloud server 106, and may be specific to the vehicle 102 or may be specific to a current driver of the vehicle 102. In particular, responsive to the vehicle 102 being started, the event evaluator 158 may transmit the vehicle identifier 170 and/or a driver identifier to the cloud server 106. For example, each mobile device 104 may be specific to a particular driver, and the mobile identifier 218 received from a mobile device 104 when interacting with the vehicle 102 may server as the driver identifier. Alternatively, the event evaluator 158 may show a GUI on the display 130 that enables a driver to submit his or her identifier to the event evaluator 158. Responsive to receiving the vehicle identifier 170 and/or driver identifier, the cloud server 106 may be configured to query the server event data 180 for trigger event definitions corresponding to the vehicle identifier 170 and/or the driver identifier, and to transmit the returned trigger event definitions to the vehicle 102. Responsive to the vehicle 102 receiving the trigger event definitions, the event evaluator 158 may be configured to store the trigger event definitions as vehicle event data 166 in the non-volatile storage 154 of the vehicle 102.

Each received trigger event may include a set capture time specifying how long video should be captured by the vehicle 102 cameras 178 responsive to the trigger event. The set capture time for each trigger event may be the same, such as two minutes. Alternatively, two or more trigger events may have a different set capture time, which may be determined by the service provider when defining the trigger event. The set capture time for each trigger event may be limited to being between a set minimum and maximum capture time.

Trigger events defined in the server event data 180 and transmitted to the vehicle 102 may be trigger events that are defined at the cloud server 106, such as via the server provider, and may not be customizable or changeable by a vehicle 102 user. These trigger events may be referred to as server-defined trigger events. In addition or alternatively to receiving server-defined trigger events, the system 100 may also be configured to enable a vehicle 102 user, such as a passenger or driver, to create customized trigger events monitored for by the vehicle 102. In particular, a vehicle 102 user may define custom trigger events by interacting with the vehicle 102 display 130 or the mobile device 104. Trigger events customized by a vehicle 102 user may be referred to as user-defined trigger events.

For example, the mobile device 104 may be configured to display a GUI for creating user-defined trigger events via execution of the event customizer 216. The event evaluator 158 of the vehicle computing platform 112 may be configured to show a similar GUI on the display 130. A user may interact with the displayed GUI to create custom trigger events, which may likewise correspond to a specific vehicle 102 activity, such as a driving behavior, defined by the user, and which may be recognized from data generated by the sensors of the vehicle 102. As an example, a user may define a trigger event corresponding to a remote start of the vehicle 102. Similar to the server-defined trigger events, each user-defined trigger event may include a set capture time indicating how long video should be captured responsive to occurrence of the trigger event. Each user-defined trigger event may include a non-customizable set capture time, such as two minutes. Alternatively, each user-defined trigger event may be given a default set capture time, such as two minutes, and the user may be able to uniquely adjust the set capture time for each user-defined trigger event between a minimum and maximum time range, such as via the mobile device 104 or the vehicle 102 display 130.

Responsive to a user-defined trigger event being created, the trigger event may be stored in the vehicle 102 non-volatile storage 154 as vehicle event data 166. For example, if the trigger event is created via a GUI shown on the vehicle 102 display 130, then the event evaluator 158 may store the trigger event in the vehicle 102 non-volatile storage 154. Alternatively, if the user-defined trigger event is created via the mobile device 104, then the event customizer 216 may cause the mobile device 104 to transmit the trigger event to the vehicle computing platform 112, such as over a local connection formed with the vehicle computing platform 112 or over the network 110, and possibly also with the cloud server 106 acting as forwarding mechanism. Responsive to the vehicle 102 receiving the user-defined trigger event, the event evaluator 158 may cause the vehicle computing platform 112 to store the trigger event in the non-volatile storage 154 as vehicle event data 166.

In block 304, the vehicle 102 may monitor for trigger events defined in the vehicle event data 166. Specifically, the event evaluator 158 may be configured to monitor for and identify the defined trigger events from data generated by the vehicle 102 sensors. The vehicle 102 sensors may generate such data when the vehicle 102 is operated, which may include when the vehicle 102 engine is running, when vehicle 102 systems are powered on while the vehicle 102 engine is off, and when a user interacts with the vehicle 102 to unlock, lock, remote start, or access the vehicle 102. The vehicle 102 sensors may also generate data when the vehicle 102 is parked and unoccupied, such as if the vehicle 102 experiences an impact from another object or driver. The event evaluator 158 may be configured to identify trigger events from data generated by the vehicle 102 sensors responsive to the data being generated. Thus, responsive to an interaction with the vehicle 102, such as the vehicle 102 being accessed, started, driven, or involved in a collision as some non-limiting examples, the vehicle 102 sensors may generate data indictive to the interaction, and the event evaluator 158 may immediately thereafter analyze the generated data to identify whether the interaction satisfies a defined trigger event.

If the event evaluator 158 determines that a defined trigger event has not occurred ("No" branch of block 306), then the event evaluator 158 may continue monitoring for defined trigger events in block 304. If a defined trigger event is identified from the sensor data ("Yes" branch of block 306), then in block 308, the event evaluator 158 may begin capturing video showing one or more areas around the vehicle 102 via the cameras 178 of the vehicle 102. The event evaluator 158 may cause the cameras 178 to capture video for the set capture time associated with the trigger event identified from the sensor data. Responsive to identifying a trigger event from the sensor data in block 306, the event evaluator 158 may also cause the vehicle 102 to show on the display 130 and/or to communicate a notification to the cloud server 106 and/or the mobile device 104 that a trigger event has been identified and video recording has begun.

In block 310, the vehicle 102 may determine whether a trigger event defined in the vehicle event data 166 occurs while the video is being captured responsive to the trigger event identified in block 306. In particular, while the video is being captured, the vehicle 102 sensors may continue to generate data indicative of vehicle 102 activities, and the event evaluator 158 may continue monitoring for the defined trigger events. Responsive to no further trigger event occurrences being identified while the video is being captured ("No" branch of block 310), then in block 312, the event evaluator 158 may determine whether an amount of video captured by the vehicle 102 cameras 178 is equal to the set capture time associated with the trigger event identified in block 306. If not ("No" branch of block 312), then in block 310, the event evaluator 158 may continue monitoring for further defined trigger event occurrences while the vehicle 102 continues capturing video. Alternatively, if the amount of captured video is equal to or greater than the set capture time ("Yes" branch of block 312), then in block 314, the event evaluator 158 may cause the vehicle 102 cameras 178 to stop capturing video. The event evaluator 158 may also cause the vehicle 102 to show on the display 130 and/or to communicate a notification to the cloud server 106 and/or the mobile device 104 that recording has finished.

Referring back to block 310, responsive to identifying another occurrence of a defined trigger event, which may be the same or a different trigger event from the trigger event identified in block 306, while the video is being captured ("Yes" branch of block 310), then in block 316, the event evaluator 158 may extend the capture time for capturing video content. For example, the event evaluator 158 may extend the video capture time by the set capture time associated with the initial trigger event identified in block 306 (e.g., if the initial occurring trigger event is associated with a set capture time of two minutes, the event evaluator 158 may extend the capture time of two minutes by another two minutes for a total of four minutes). Alternatively, the event evaluator 158 may extend the capture time by the set capture time associated with the later occurring trigger event identified in block 310 (e.g., if the initial occurring trigger event is associated with a set capture time of two minutes and the subsequent occurring trigger event is associated with a set capture time of three minutes, the event evaluator may extend the capture time of two minutes by three minutes for a total of five minutes). In either case, the capture time utilized in block 312 may be the total capture time after the extension. Responsive to the capture time being extended, the event evaluator 158 may also cause the vehicle 102 to show on the display 130 and/or to communicate a notification to the cloud server 106 and/or the mobile device 104 that the capture time has been extended.

After the capture time is extended in block 316, while the video continues to be captured, the event evaluator 158 may continue, in block 310, to monitor for the occurrence of additional trigger events and, upon identifying another occurrence of a trigger event, may further extend the total capture time in block 316. The event evaluator 158 may continue this activity until, in block 312, the amount of video captured is equal to or greater than the total extended capture time.

In block 318, after the video is finished being captured, the event evaluator 158 may be configured to store the captured video in an embedded data storage device of the vehicle 102, such as the non-volatile storage 154. Specifically, the event evaluator 158 may store video data 168 for the captured video that includes the captured video, and may include in association with the captured video each defined trigger event that caused the video to be captured (e.g., initial trigger event identified in block 306 and any additional trigger events identified in block 310). The video data 168 for the captured video may also include the one or more portions of the data generated by the vehicle 102 sensors from which the event evaluator 158 identified the defined trigger events that caused the video to be captured, such that the portions of the data are associated with the captured video. For example, the portions of the data may include speed values, seatbelt status, and any other values or statuses generated by the vehicle 102 sensors that indicated in whole or in part one of the identified trigger events. The video data 168 may thus include a record for the identified trigger events that includes the captured video, the one or more identified trigger events that resulted in the captured video, and the sensor data from which the one or more trigger events were identified. When the vehicle 102 distributes the captured video to the cloud server 106 or the mobile device 104, the vehicle 102 may also be configured to transmit the other data associated with the captured video within the video data 168.

In some embodiments, the vehicle 102, or more particularly the event evaluator 158, may be configured to perform all or part of the process 300 separately for the user-defined trigger events and the server-defined trigger events. For example, the event evaluator 158 may be configured to separately monitor for user-defined trigger events and server-defined trigger events in block 304. Responsive to the event evaluator 158 identifying a server-defined trigger event in block 306, in blocks 310 and 316, the event evaluator 158 may only extend the capture time for video captured responsive to the identified server-defined trigger event in response to further server-defined trigger events, and then proceed to store video data 168 for the one or more identified server-defined trigger events in block 318. While the event evaluator 158 performs blocks 308 through 318 for the identified server-defined trigger event, the event evaluator 158 may continue to monitor for user-define trigger events in block 304. Responsive to identifying a user-defined trigger event in block 306, the event evaluator 158, in blocks 310 and 316, may similarly only extend the capture time for video captured responsive to the identified user-defined trigger event in response to further user-defined trigger events, and then proceed to store video data 168 for the one or more identified user-defined trigger events in block 318. In other words, the event evaluator 158 may be configured to monitor for and capture and store video for user-defined trigger events and server-defined trigger events separately.

Figure 3:
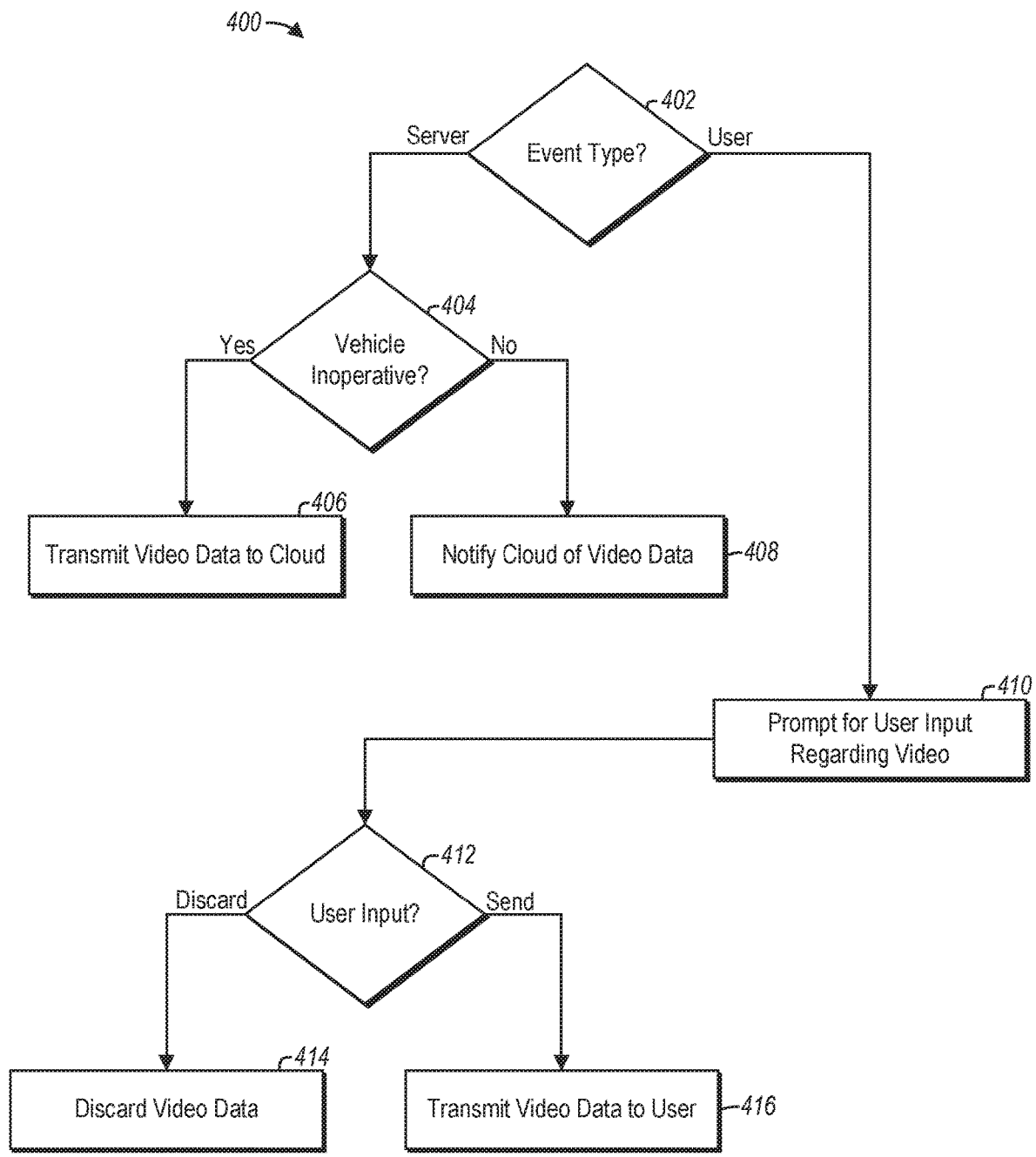
FIG. 3 is a flowchart illustrating an exemplary process for distributing captured vehicle video that may be performed by the system of FIG. 1.

FIG. 3 illustrates a process 400 that may be performed by the system 100 responsive to performance of the process 300 of FIG. 2, or more specifically, responsive to the vehicle 102 generating and/or storing video data 168 in the process 300. In particular, the system 100 may perform the process 300 to distribute each instance of generated and/or stored video data 168 to the cloud server 106 and mobile device 104.

In block 402, the event evaluator 158 may determine whether one or more of the identified trigger events that caused or extended a video capture instance in the process 300, such as the initial trigger event identified in block 306 (FIG. 2), is a server-defined trigger event or a user-defined trigger event. As previously described, the server-defined trigger events may include trigger events defined in the server event data 180 maintained by the cloud server 106, and may be configured to cause the event evaluator 158 to monitor for vehicle 102 activities specified by a service provider. The user-defined trigger events may be custom trigger events generated by a vehicle 102 user, such as the driver of the vehicle 102, via the vehicle 102 display 130 or via a mobile device 104, and may thus be configured to cause the event evaluator 158 to monitor for vehicle 102 activities specified by the vehicle 102 user. The vehicle event data 166 stored in the vehicle 102 may indicate for each defined trigger event whether the trigger event is a server-defined trigger event or a user-defined trigger event.

Responsive to determining that one or more of the trigger events that caused or extended a video capture instance were server-defined trigger events ("Server" branch of block 402), then in block 404, the event evaluator 158 may determine whether these one or more trigger events rendered the vehicle 102 as inoperative. The vehicle 102 may be considered as rendered inoperative when airbags within the vehicle 102 have been deployed, which may be indicated by a vehicle 102 airbag sensor, or when the vehicle 102 is not drivable, such as due to an engine malfunction or other mechanical malfunction, which may be indicated by a vehicle 102 component malfunction sensor. Upon the vehicle 102 being rendered inoperative, the vehicle 102 sensors may generate data indicative of the inoperative state of the vehicle 102. After the video capture instance responsive to the one or more identified server-defined trigger events is completed by the vehicle 102, the event evaluator 158 may analyze the data generated by the vehicle 102 sensors to determine whether the vehicle 102 was rendered inoperative from the identified server-defined trigger events causing or extending the video capture instance.

Responsive to the vehicle 102 being rendered inoperative from the one or more server-defined trigger events causing or extending a video capture instance ("Yes" branch of block 404), in block 406, the event evaluator 158 may automatically transmit the video data 168 for the one or more server-defined trigger events, or in other words, the captured video, trigger event identifiers, and/or associated sensor data, to the cloud server 106 over the network 110. In other words, the event evaluator 158 may not be configured to wait for a request for the video data 168 before transmitting. In this way, should the vehicle 102 later become unavailable, such as due to being towed to a restricted location and/or destroyed, the cloud server 106 will have the video data 168 that relates to the server-defined trigger events.

If for some reason the vehicle 102 is unable to send the video data 168 to the cloud server 106, such as if access to the network 110 is unavailable due to limited network connectivity caused by the current geographic location of or damage to the vehicle 102, the vehicle 102 may continue to store the video data 168 in local vehicle storage (e.g., the non-volatile storage 154). In this case, the event evaluator 158 may be configured to retry sending the video data 168 at a later time. Additionally, responsive to a failed transmission attempt, the event evaluator 158 may be configured to communicate a message to the cloud server 106 notifying that the video data 168 is available, but unable to be uploaded. Such a message may be much smaller than the video data 168 transmission, thereby enabling the message to be transmitted in situations where the connection to the network 110 is not strong enough to permit sending all of the video data 168. The notification may also be sent via a different type of network than the video data 168, such as a text message network or a voice network, to which the cellular modem 124 of the vehicle 102 is subscribed and has a better connection. Responsive to receiving the notification, the cloud server 106 may attempt to connect to the vehicle 102 to retrieve the video data 168 over the network 110, such as periodically or on-demand by the service provider, and/or the service provider may physical locate and travel to the vehicle 102 to obtain the video data 168 directly from the vehicle 102.

Responsive to the vehicle 102 not being rendered inoperative from the one or more server-defined trigger events ("No" branch of block 404), in block 408, the event evaluator 158 may cause the vehicle 102 to communicate a notification to the cloud server 106 over the network 110 that video data 168 for the one or more server-defined trigger events is available for download from the vehicle 102. Responsive to receiving the notification, the cloud server 106 may connect to the vehicle 102 over the network 110 to retrieve the video data 168, either automatically or on demand by the service provider. For example, the notification may include the vehicle identifier 170, may include a driver identifier associated with the video data 168 that indicates the driver operating the vehicle 102 when the trigger events were identified, and may include a unique video data 168 identifier associated with the video data 168 within local vehicle storage.

At a convenient time for the cloud server 106, such as when the workload of the cloud server 106 is relatively low, the cloud server 106 may be configured to automatically connect to the vehicle 102 based on the vehicle identifier 170 included in the notification, and transmit a download request to the vehicle 102 to retrieve undownloaded video data 168. Alternatively, the cloud server 106 may query the vehicle 102 for undownloaded video data 168 specific to the driver identifier or the unique video data 168 identifier included in the notification, such as if multiple drivers of the vehicle 102 are served by different cloud servers 106. The cloud server 106 may also be configured to communicate a control message to the vehicle 102 that identifies, such as via the unique video data 168 identifier, and causes the event evaluator 158 to delete video data 168 that relates to server-defined trigger events. Additionally, or alternatively, the event evaluator 158 may be configured to delete video data 168 from local vehicle 102 storage responsive to receiving a notification of successful transmission of the video data 168 to the cloud server 106.

Referring back to block 402, responsive to one or more of the trigger events that caused a video capture instance in the process 300 being user-defined trigger events ("User" branch of block 402), the event evaluator 158 may be configured to transmit the captured video offboard the vehicle 102 for delivery to a personal computing device of a vehicle 102 user, such as a mobile device 104. Specifically, in block 410, the event evaluator 158 may be configured to display a prompt for user input on the vehicle 102 display 130 regarding the video data 168. The displayed prompt may be configured to receive user input indicating to discard the captured and stored video data 168 corresponding to the one or more user-defined trigger events, and to receive user input indicating to transmit the video data 168 offboard the vehicle 102 to the mobile device 104.

In block 412, the event evaluator 158 may determine whether received user input directs the vehicle 102 to discard the video data 168 corresponding to the user-defined trigger events, or to transmit the video data 168. Responsive to the user input indicating to discard the video data 168 ("Discard" branch of block 412), in block 414, the event evaluator 258 may delete the video data 168 from local vehicle 102 storage. Alternatively, or additionally, the displayed prompt may be configured to receive user input indicating to not transmit but continue storing the video data 168, such as for later retrieval. Responsive to receiving such user input, the event evaluator 158 may maintain the video data 168 generated for the one or more identified user-defined trigger events in the vehicle 102 local electronic data storage.

Responsive to the user input indicating to transmit the video data 168 ("Send" branch of block 412), in block 416, the event evaluator 158 may cause the vehicle 102 to transmit the video data 168 to the mobile device 104. The vehicle 102 may transmit the video data 168 to the mobile device 104 via a direct local connection formed between the mobile device 104 and the vehicle 102, or over the network 110. For example, the vehicle 102 may transmit the video data 168, the vehicle identifier 170, and/or the mobile identifier 218 received from the mobile device 104 when interacting with the vehicle 102 to the cloud server 106, and the mobile device 104 may then retrieve or receive the video data 168 from the cloud server 106 by submitting the vehicle identifier 170 and/or the mobile identifier 218 to the cloud server 106. Alternatively, the cloud server 106 may automatically push the video data 168 to the mobile device 104 based on the vehicle identifier 170 and/or the mobile identifier 218. In either case, responsive to receiving the video data 168, the mobile device 104 may be configured to display the video data 168, and to share the video data 168 on a social network or via a messaging service.

The vehicle 102 may include electronic data storage, such as a portion of the non-volatile storage 154, that is specifically allocated to storing video data 168. The event evaluator 158 may be configured to identify when the allocated storage is getting full, such as by monitoring whether the amount of video data 168 stored in the allocated storage is equal to or greater than a set percentage of the data capacity of the allocated storage. Responsive to the allocated storage including an amount of stored data, such as video data 168, that is equal to or greater than the set percentage of the data capacity of the allocated storage, the event evaluator 158 may be configured to show a notification on the display 130 that the allocated storage is near maximum capacity, and may communicate a notification to the cloud server 106 over the network 110, and/or to the mobile device 104 via a local direct connection or over the network 110, that the allocated storage is near maximum capacity.

Responsive to the cloud server 106 receiving the notification, the cloud server 106 may connect to and download from the vehicle 102 any video data 168 relating to server-defined trigger events that has yet to downloaded, potentially based on a driver identifier for a driver served by cloud server 106 and based on the vehicle identifier 170. The cloud server 106 may thereafter communicate a control signal to the vehicle 102 that causes the event evaluator 158 to delete video data 168 from the allocated storage that is associated with the cloud server 106 and corresponds to server-defined trigger events. Responsive to the mobile device 104 receiving the notification, or to a notification being shown on the vehicle 102 display 130, a vehicle 102 user may interact with the mobile device 104 or display 130 to transmit video data 168 for user-defined trigger events included in the allocated storage to the mobile device 104, and to delete video data 168 for user-defined trigger events from the allocated storage. The vehicle 102 user may not be able to retrieve or delete video data 168 for server-defined trigger events in the allocated storage, and the cloud server 106 may not be able to retrieve and delete video data 168 for user-defined trigger events in the allocated storage.

In some embodiments, the vehicle 102 may have separate allocated internal storage for video data 168 for server-defined trigger events and for video data 168 for user-defined trigger events. In this case, the event evaluator 158 may be configured to monitor the amount of data in each allocated storage separately, and to notify the corresponding party (e.g., cloud server 106 for server-defined trigger event allocated storage, the vehicle 102 user via the display 130 or mobile device 104 for user-defined trigger event allocated storage) when a given one of the allocated storages is nearing full capacity. Neither vehicle 102 users nor the cloud server 106 may be able to access and delete video data 168 from the allocated storage for the other.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:
1. A system comprising:
a vehicle configured to monitor for a first trigger event corresponding to a different defined vehicle activity;

responsive to an occurrence of the first trigger event, capture, via a vehicle camera, a first video showing an area outside the vehicle for a first set capture time;

responsive to the vehicle identifying that the vehicle is rendered inoperative from the first trigger event, transmit the first video to a remote server;

responsive to detecting a mobile device connected to the vehicle receive a second trigger event from the mobile device, the second trigger event being defined by the mobile device customized for a user;

responsive to receiving user input via a human-machine interface of the vehicle, modify the second trigger event into a modified second trigger event;

monitor for the modified second trigger event;

responsive to an occurrence of the modified second trigger event, capture, via the vehicle camera, second video showing the area outside the vehicle; and illustrate, via a vehicle display, a prompt configured to receive, via the vehicle display, first user input indicating to discard the second video and second user input indicating to transmit the second video to a mobile device of a vehicle user.

2. The system of claim 1, wherein the vehicle is configured to, responsive to the vehicle identifying that the vehicle is not rendered inoperative from the first trigger event:

notify the remote server that the first video is available for download from the vehicle; and responsive to receiving a download request for the first video from the remote server after the remote server is notified, transmit the first video to the remote server.

3. The system of claim 1, wherein the first trigger event include an excessive acceleration event, an excessive braking event, and a collision event.

4. The system of claim 1, wherein the vehicle comprises a plurality of sensors configured to generate data indicative of vehicle activity, and the vehicle is configured to identify the occurrence of the first trigger event from a portion of the data.

5. The system of claim 4, wherein the vehicle is configured to:

associate, in a data storage device of the vehicle, the first video with the portion of the data from which the occurrence of the first trigger event is identified; and transmit the portion of the data associated with the first video in the data storage device of the vehicle to the remote server with the first video.

6. The system of claim 1, wherein the set capture time is a first set capture time, the occurrence of the first trigger event is a first occurrence of one of a plurality trigger events, and the vehicle is configured to, responsive to a second occurrence of one of the plurality of trigger events while the first video is being captured, extend the capture of the first video by a second set capture time.

7. The system of claim 6, wherein each of the plurality of trigger events is associated with a different set capture time, the first set capture time is the set capture time associated with the one trigger event of the first occurrence, and the second set capture time is the set capture time associated with the one trigger event of the second occurrence.

8. The system of claim 1, wherein the vehicle includes electronic storage allocated to storing the first video captured by the vehicle responsive to the first trigger events, and the vehicle is configured to, responsive to the allocated storage including an amount of stored data greater than a set percentage of a data capacity of the allocated storage, notify the remote server that the allocated storage is near maximum capacity.

9. The system of claim 1, wherein the second trigger event is customizable by the vehicle user, and the first trigger events are not customizable by the vehicle user.

10. The system of claim 1, wherein the first trigger event is defined at the remote server.

11. The system of claim 1, wherein the vehicle is configured to transmit a vehicle identifier to the remote server, and the first trigger event received by the vehicle from the remote server responsive to the transmission of the vehicle identifier.

12. A method comprising:

monitoring, by a vehicle, for a first trigger event corresponding to a defined vehicle activity;

responsive to the vehicle identifying an occurrence of the first trigger event, capturing, via a vehicle camera, a first video showing an area outside the vehicle for a set capture time;

responsive to the vehicle identifying that the vehicle is rendered inoperative from the trigger event, transmitting the first video to a remote server;

responsive to detecting a mobile device connected to the vehicle, receiving a second trigger event from the mobile device, the second trigger event being defined by the mobile device customized for a user, responsive to receiving user input via a human-machine interface of the vehicle, modifying the second trigger event into a modified second trigger event;

monitoring for the modified second trigger event;

responsive to an occurrence of the modified second trigger event, capturing, via the vehicle camera, second video showing the area outside of the vehicle; and illustrating, on the vehicle display, a prompt configured to receive, via the vehicle display, first user input indicating to discard the second video and second user input indicating to transmit the second video to the mobile device of the vehicle user.

13. The method of claim 12, further comprising, responsive to the vehicle identifying that the vehicle is not rendered inoperative from the first trigger event:

notifying the remote server that the first video is available for download from the vehicle; and responsive to receiving a download request for the first video from the remote server after the remote server is notified, transmitting the first video to the remote server.

14. The method of claim 12, further comprising:

generating data indicative of vehicle activity via a plurality of vehicle sensors; and identifying the occurrence of the first trigger event from a portion of the data.

15. The method of claim 14, further comprising:

associating, in a data storage device of the vehicle, the first video with the portion of the data from which the occurrence of the first trigger event is identified; and transmitting the portion of the data associated with the first video in the data storage device of the vehicle to the remote server with the first video.

16. The method of claim 12, wherein the set capture time is a first set capture time, the occurrence of the first trigger event is a first occurrence of one of a plurality of trigger events, and further comprising, responsive to a second occurrence of one of the plurality of trigger events while the first video is being captured, extending the capture of the first video by a second set capture time.

* * * * *